G. JESSUP.
THRESHING AND CLEANING MACHINE.

No. 5,667. Patented July 18, 1848.

UNITED STATES PATENT OFFICE.

GILBERT JESSUP, OF NEWARK, NEW YORK.

THRESHING-MACHINE.

Specification of Letters Patent No. 5,667, dated July 18, 1848.

*To all whom it may concern:*

Figure 1:
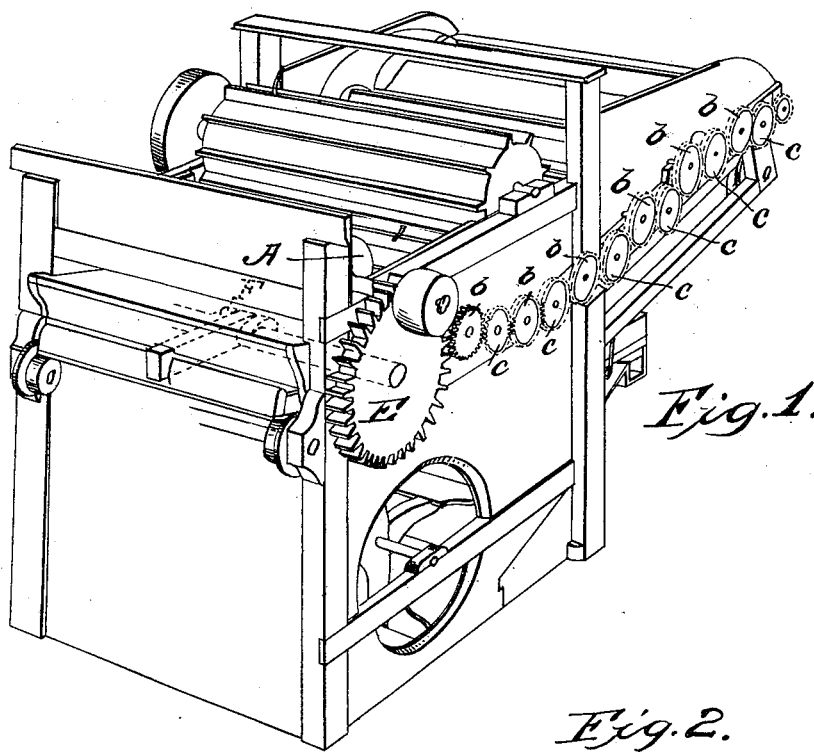
Figure 2:
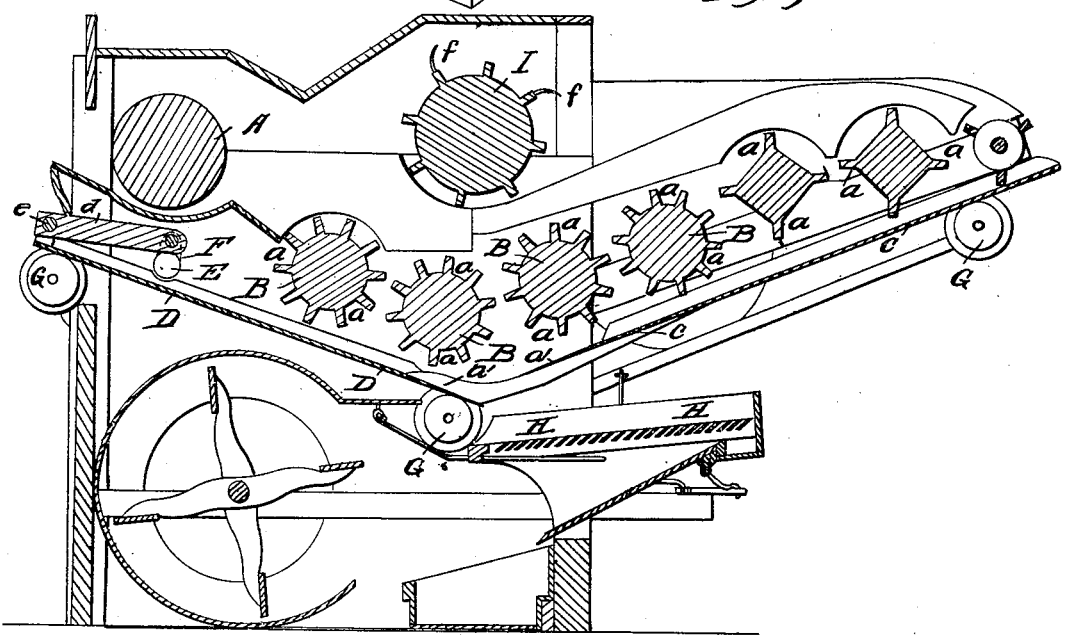

Be it known that I, GILBERT JESSUP, of Newark, in the county of Wayne and State of New York, have made a new and useful Improvement in the Manner of Constructing Machines for the Threshing and Cleaning of Grain; and I do hereby declare that the following is a full and exact description thereof.
In the accompanying drawing Figure 1 is a perspective view of the machine, the cover being removed that incloses the threshing cylinder, and other portions of its fore end. Fig. 2, is a vertical section from front to back, at or near its middle.

A, is the threshing cylinder, which, with its concave, is similar to those in other threshing machines. The straw as it escapes from the threshing apparatus is received on to a series of revolving cylinders B, B, which are placed nearly in contact with each other, and perform the office of carrying off the straw usually performed by an endless apron, or by hollow reeds, or beaters. Above these cylinders I place another I, finished with hooked teeth *f, f,* to aid in carrying and shaking the straw. These cylinders have ledges, or wings, *a, a,* along them so as to divide them into cells or troughs; on the shafts of these cylinders there are toothed wheels *b, b,* that gear into intermediate wheels *c, c,* and motion being communicated to one of the cylinders the whole will be moved in the proper direction.
Below these cylinders, and also below the threshing machine there are inclined boards which convey the grain and chaff to the cleaning apparatus, which consists principally of the ordinary fan wheel, and of a screen composed of slats, instead of a wire sieve, the slats being placed in a sloping direction like those of a blind. C, C, and D, D, are the inclined boards that convey the grain to be cleaned. These boards are firmly connected together, by pieces of iron or wood *a', a',* at their edges on their inner ends; between *a', a',* is an open space for the grain to fall through onto the screen. It has been usual to shake boards of this description vertically, or laterally, but I have found it much more effectual, in causing the grain and chaff to descend regularly, to give them a vibratory motion endwise, for this purpose I place a crank on the shaft E' of the toothed wheel E, Fig. 1, which is driven by a pinion on the shaft of the threshing cylinder, or in any other convenient way; this crank by which the inclined boards C, and D, are vibrated, is shown at F, in the section; *d* is a link by which the crank is connected by a joint pin with the inclined board at *e*. G, G, are truck, or friction rollers to sustain the edges of said boards, and to allow them to move freely.

H, is the slatted screen, upon which the grain is to fall from the inclined boards, and which receive the wind from the blowing wheel in a much more effective manner than the ordinary screen of woven wire. This screen is suspended in the usual manner, and is shaken by a crank motion from the opposite end of the shaft of the wheel E.

Having thus fully described the manner in which I construct my machine for the threshing and cleaning of wheat, and other grain, and shown how the respective parts thereof operate, what I claim therein as new, and desire to secure by Letters Patent is—

1. The manner of constructing the cylinders that carry forward the straw, which cylinders are formed into troughs, or cells that aid in the separating of the grain, and are not liable to become obstructed by entanglement of the straw, as is the case with open cylinders.

2. I claim also the combining of the two inclined boards C, and D, with each other, and the shaking, or vibrating of them endwise, in the manner set forth.

GILBERT JESSUP.

Witnesses:
THOS. P. JONES,
EDWIN L. BRUNDAGE.